(12) United States Patent
Chossat (10) Patent No.: US 12,335,402 B2
(45) Date of Patent: Jun. 17, 2025

(54) METHOD OF HASHING A VIDEO STREAM

(71) Applicant: STMicroelectronics (Grenoble 2) SAS, Grenoble (FR)

(72) Inventor: Jérôme Pierre René Chossat, Voiron (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 194 days.

(21) Appl. No.: 18/150,566

(22) Filed: Jan. 5, 2023

(65) Prior Publication Data

US 2023/0261879 A1 Aug. 17, 2023

(30) Foreign Application Priority Data

Feb. 11, 2022 (FR) ........................................ 2201221

(51) Int. Cl.
*H04L 29/06* (2006.01)
*H04L 9/08* (2006.01)
*H04L 9/32* (2006.01)

(52) U.S. Cl.
CPC .......... *H04L 9/3239* (2013.01); *H04L 9/0869* (2013.01)

(58) Field of Classification Search
None
See application file for complete search history.

(56) References Cited

U.S. PATENT DOCUMENTS

| 5,710,719 A * | 1/1998 | Houle ................. H04N 19/593 708/203 |
| 6,266,429 B1 * | 7/2001 | Lord .................. H04N 1/32128 380/268 |
| 9,063,309 B2 * | 6/2015 | Scofet ................. G02B 6/4281 |
| 9,245,133 B1 * | 1/2016 | Durst ................... G06F 21/602 |
| 10,715,183 B1 * | 7/2020 | Walters ............... H04N 19/186 |
| 2003/0223614 A1 * | 12/2003 | Robins ............... H04N 1/32144 382/100 |
| 2006/0117183 A1 * | 6/2006 | Hatano .............. H04N 1/32101 713/176 |
| 2008/0012972 A1 | 1/2008 | Hirai |
| 2011/0085204 A1 * | 4/2011 | Hamada ................ H04N 1/444 358/1.15 |
| 2011/0102633 A1 * | 5/2011 | Hirai ....................... H04K 1/00 348/231.3 |

(Continued)

FOREIGN PATENT DOCUMENTS

EP 3907643 A1 11/2021

*Primary Examiner* — Maung T Lwin
(74) *Attorney, Agent, or Firm* — Slater Matsil, LLP (57) ABSTRACT

In accordance with an embodiment, a video flow transmission method includes: the generating, by an image sensor, a video flow comprising first and second images; hashing, by the image sensor, a portion of the first image based on a first hashing configuration to generate a first hash value, the first hashing configuration defining first positions of pixels to be hashed; hashing, by the image sensor, a portion of the second image based on a second hashing configuration to generate a second hash value, the second hashing configuration being different from the first configuration and defining second positions of pixels to be hashed; and transmitting, by the image sensor, the first and second images, and the first and second hash values, to a second device.

20 Claims, 7 Drawing Sheets

(56) References Cited

U.S. PATENT DOCUMENTS

| | | | |
|---|---|---|---|
| 2016/0037172 A1* | 2/2016 | Shimizu | H04N 19/176 375/240.12 |
| 2020/0327671 A1* | 10/2020 | Arbel | G06T 7/10 |
| 2021/0314159 A1* | 10/2021 | Moore | G06F 21/16 |

* cited by examiner

METHOD OF HASHING A VIDEO STREAM

CROSS-REFERENCE TO RELATED APPLICATIONS

This application is a translation of and claims the priority benefit of French patent application number FR2201221, filed on Feb. 11, 2022, entitled "Procédé de hachage partiel d'un flux vidéo", which is hereby incorporated by reference to the maximum extent allowable by law.

TECHNICAL FIELD

The present disclosure is generally directed to a method of hashing a video stream.

BACKGROUND

For certain applications, such as applications in the automobile field, it is important to ensure the integrity of the images of a video flow transmitted between an image sensor and a processing unit. A solution comprises hashing the images with a hash function on the image sensor side, and applying the same hash function on the processing unit side. The results of the hashing are then compared to detect possible modifications.

However, in such applications, the rate of images recorded by the image sensor may be high. Further, there is a tendency to increase the resolution of images. In certain cases, there may occur for the image sensor not to have a sufficient performance to apply a hash function to these images while keeping up with the rate of the flow. Similarly, the hash functions implemented by the processor receiving these images may not be fast enough to ensure the full hashing of each image.

SUMMARY

An embodiment provides a video flow transmission method comprising: the generation, by an image sensor, of a video flow comprising first and second images, each image being an arrangement of pixels at corresponding pixel positions, each pixel being associated with one or plurality of pixel data; the hashing, by the image sensor, of a portion of the first image based on a first hashing configuration to generate a first hash value, the first configuration defining first positions of pixels to be hashed; the hashing, by the image sensor, of a portion of the second image based on a second hashing configuration to generate a second hash value, the second configuration being different from the first configuration and defining second positions of pixels to be hashed; and the transmission, by the image sensor, of the first and second images, and of the first and second hash values, to a second device.

According to an embodiment, a least one pixel position among the first pixel positions does not belong to the second positions and/or at least one pixel position among the second pixel positions does not belong to the first positions.

According to an embodiment, the above method further comprises the transmission, from the image sensor to the second device, of one or a plurality of values indicating the first and second hashing configurations.

According to an embodiment, the above method comprises, before said partial hashing of the first and second images, the reception by the image sensor, from the second device, of a configuration table where at least the first and second hashing configurations are indexed, the first configuration being indexed at a first index and the second configuration being indexed at a second index, the method further comprising the transmission, by the image sensor, of the first and second indexes to the second device.

According to an embodiment, the configuration table received by the image sensor is ciphered, the method further comprising the deciphering, by the image sensor, of the ciphered configuration table.

According to an embodiment, the first index is transmitted to the second device in a status line of the first image and the second index is transmitted to the second device in a status line of the second image.

According to an embodiment, the first and second indexes are randomly selected, by the image sensor, among at least three indexes of the configuration table.

According to an embodiment: the first hashing configuration is indicated, to the second device, by the image sensor in a status line of the first image; and the second hashing configuration is indicated, to the second device, by the image sensor, in a status line of the second image.

According to an embodiment, said hashing steps comprise the use of the SHA-2 hash algorithm.

According to an embodiment, the proportion of first positions of pixels to be hashed among all the pixels of the first image is in the range from 25% to 80% and the proportion of second positions of pixels to be hashed among all the pixels of the second image is in the range from 25% to 80%.

According to an embodiment, each image of the video flow is formed of a plurality of data packets, each packet comprising a plurality of pixel data associated with the pixels of the image, the size of each data packet being programmable; and each of the first and second configurations defining: the size of one or a plurality of packets of an image to be hashed; and the size of one or a plurality of packets of an image not to be hashed; or the size of one or a plurality of packets of an image to be hashed and the size of one or a plurality of packets of an image not to be hashed.

According to an embodiment, the above method further comprises the random generation, by a random number generator, of the size of said one or a plurality of packets of the image to be hashed and/or the size of said one or a plurality of packets of the image not to be hashed.

An embodiment provides a method of verification of the integrity of a video flow, comprising: the reception, by a processing device, of a video flow comprising first and second images, each image being an arrangement of pixels at corresponding pixel positions, each pixel being associated with one or plurality of pixel data; the reception, by the processing device, of a first hash value associated with the first image and of a second hash value associated with the second image; the hashing, by the processing device, of a portion of the first image based on a first hashing configuration to generate another first hash value, the first configuration defining first positions of pixels to be hashed; the hashing, by the processing device, of a portion of the second image based on a second hashing configuration to generate another second hash value, the second configuration being different from the first configuration and defining second positions of pixels to be hashed; and the verification, by the processing device, of the integrity of the video flow based on a first comparison of the first hash value with the other first hash value and on a second comparison of the second hash value with the other second hash value.

According to an embodiment, the above method further comprises: the determination, by the processing device, of the first and second positions of pixels to be hashed according to a random sequence generated from a seed; and the transmission, by the processing device, of the seed to the image sensor.

According to an embodiment, the above method further comprises, if the first hash value does not correspond to the other first hash value, or the second hash value does not correspond to the other second hash value, the deactivation of the image sensor.

An embodiment provides an image sensor comprising: an array of pixels configured to capture images; a first processing device configured to receive images captured by the pixel array, to generate a video flow comprising at least one first image and at least one second image, and to transmit the video flow to a second device, each image being an arrangement of pixels at corresponding pixel positions, each pixel being associated with one or a plurality of pixel data; a hashing circuit, configured to: hash a portion of the first image, based on a first hashing configuration, to generate a first hash value and transmit the first hash value to the second device, the first configuration defining first positions of pixels to be hashed, and hash a portion of the second image, based on a second hashing configuration, to generate a second hash value and transmit the second hash value to the second device, the second configuration being different from the first configuration and defining second positions of pixels to be hashed.

An embodiment provides a processing device configured to: receive a video flow comprising first and second images, each image being an arrangement of pixels at corresponding pixel positions, each pixel being associated with one or plurality of pixel data; receive a first hash value associated with the first image and a second hash value associated with the second image; hash a portion of the first image based on a first hashing configuration to generate another first hash value, the first configuration defining first positions of pixels to be hashed; hash a portion of the second image, based on a second hashing configuration, to generate another second hash value, the second configuration being different from the first configuration and defining second positions of pixels to be hashed; and verify the integrity of the video flow based on a first comparison of the first hash value with the other first hash value and on a second comparison of the second hash value with the other second hash value.

An embodiment provides a device comprising the image sensor coupled to the processing device by one or a plurality of communication buses.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, image processing methods such as size reduction, different image hashing algorithms, as well as the implementation of the image sensor and of the processing unit are not described in detail and are within the abilities of those skilled in the art.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
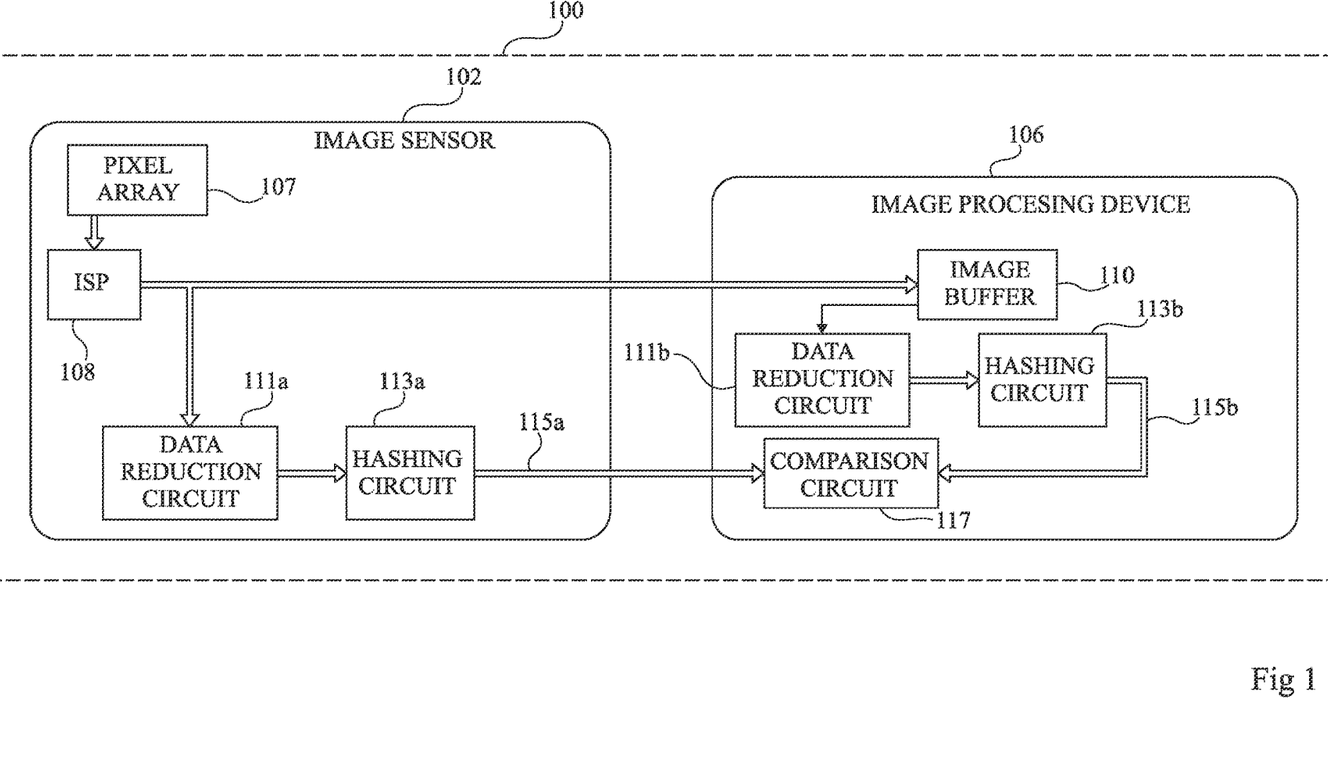
FIG. 1 schematically shows in the form of blocks a video flow capture and processing device according to an embodiment of the present disclosure.

FIG. 1 schematically shows in the form of blocks a device 100 configured to capture and process a video flow. For example, device 100 forms part of an automobile and is configured to capture and record, via an image sensor 102 (IMAGE SENSOR), the environment of the automobile. In another example, device 100 forms part of a control center and is for example configured to detect, via the video flow recorded by image sensor 102, the passing of individuals in a street or in a building.

Embodiments of the present invention may involve the protection and the security of the content of images and more particularly of a video flow. Some embodiments may provide improved methods of hashing images originating from a video flow.

Image sensor 102 is coupled, via a bus 104, to a processing unit 106 (IMAGE PROCESSING DEVICE). Processing unit 106 is for example configured to process the images of the video flow captured by image sensor 102. In the case of an automobile application, processing unit 106 is for example a control unit in a vehicle ("ECU—Electronic Control Unit"). In this example, processing unit 106 is for example configured to detect obstacles in the video flow, to alert the driver or to apply the brakes automatically. In another application, when device 100 is installed in an access control center in a secure building, processing unit 106 is for example configured to detect motions and/or to implement a face recognition algorithm in the video flow. In these applications, it is important for the images of the video flow transmitted by image sensor 102 to processing unit 106 not to be falsified or modified, and thus for the integrity of these images to be verified.

Image sensor 102 for example comprises an array of pixels 107 (PIXEL ARRAY), configured to capture images forming the video flow. The video flow captured by pixel array 107 is for example supplied to a processor 108 (ISP), integrated to image sensor 102. Processor 108 is for example an image signal processor (ISP) comprising one or a plurality of processors configured to execute software, and/or dedicated circuits, implementing the functions of processor 108. Processor 108 is for example configured to receive raw images captured by pixel array 107 and uses, for example, the data associated with each pixel to generate processed images ready to be sent to processing unit 106. In other embodiments, images sensor 102 transmits the raw images, with no processing, to processing unit 106.

Bus 104 is for example coupled to a buffer memory 110 (IMAGE BUFFER) of processing unit 106, which receives the video flow, and temporarily stores the images before they are processed by other processors/circuits (not illustrated in FIG. 1) of processing unit 106.

Image sensor 102 comprises a hashing circuit 113a (HASHING CIRCUIT) configured to generate hash values from the images of the video flow, and to transmit these hash values over a bus 115a to a comparator 117 (COMPARISON CIRCUIT) of processing unit 106. Processing unit 106 also comprises a hashing circuit 113b (HASHING CIRCUIT) configured to generate hash values from the images of the video flow received by bus 104, and to supply these hash values to comparator 117, via a bus 115b.

As an example, the two hashing circuits 113a, 113b implement a same hash algorithm, such as the SHA-2 ("Secure Hash Algorithm"). Other types of hash algorithms may of course be implemented by hashing circuits 113a, 113b.

As an example, data bus 104 transmits the images forming the video flow at a speed of approximately 600 Mpx per second, that is, approximately 750 Mbytes per second. Such a speed does not enable, for example, image sensor 102 to entirely hash the received images while keeping up with the pace of the video flow. Indeed, hash algorithms, including the SHA-2, do not allow a parallelized implementation to increase the processing speed. The limitation may also be due to a limitation of the processing speed in the hashing circuit 113b of processing unit 106.

A solution comprises only hashing part of the images of the video flow. In particular, to be able to partially hash the images of the video flow generated by image sensor 102, the quantity of data to be hashed is first decreased by a data reduction circuit 111a (DATA REDUCTION CIRCUIT) implemented, for example between processor 108 and hashing circuit 113a. A data reduction circuit 111b is also implemented on the side of processing unit 106, for example between bus 104 and hashing circuit 113b. Data reduction circuits 111a, 111b are for example configured to only select certain pixels, or groups of pixels, of the images to be hashed. The processing power requested from the hash circuits can thus be decreased.

Data reduction circuits 111a, 111b for example generate partial images, each partial image being only formed of part of the pixels of the original image from which it is generated. The partial images are then hashed by hashing circuits 113a, 113b. As an example, the number of pixels to be hashed in each partial image amounts to between 20% and 80% of the total number of pixels of the original image, preferably approximately 25%. In the case where the number of pixels to be hashed amounts to 25% of the total number of pixels, the speed of transmission of the image data to hashing circuit 113 is then decreased to approximately 150 megapixels per second, that is, approximately 190 Mbytes per second.

For each processed image, a hash value generated by hashing circuit 113b on the side of image sensor 102 and a hash value generated by hashing circuit 113b on the side of processing unit 106 are transmitted, over data buses 115a and 115B respectively, to comparator 117. Comparator 117 is configured to compare the two hash values.

In the case where the two hash values differ, this implies that the image received by processing unit 106, after reduction by reduction circuit 111b, is not the same as the image coming out of image processor 108, after reduction by reduction circuit 111a. The image has for example been falsified by an outer attacker. As an example, when comparator 117 detects a difference between the two hash values, the images originating from image sensor 102 are for example ignored, or suppressed, by processing unit 106.

If the portions of the images selected by data reduction circuits 111a, 111b in order to be hashed are the same for all images, it will be possible for an attacker to deduce, from a plurality of partially hashed images, which are the image portions protected by hashing, and which are the non-protected portions. Thus, an attacker can falsify the unprotected portions of the video flow. A solution comprises varying the selection of pixels to be hashed by data reduction circuits 111a, 111b, as will now be described in further detail in relation with FIG. 2.

Figure 2:
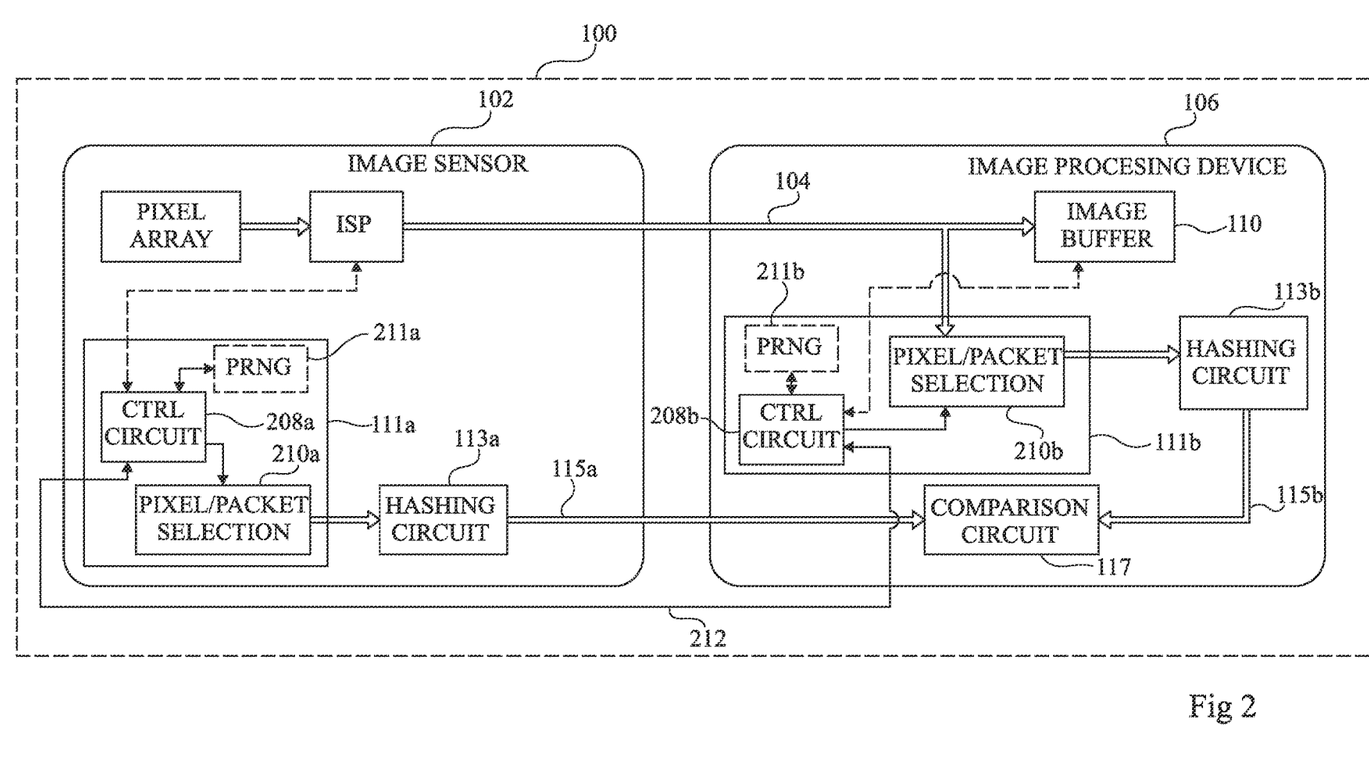
FIG. 2 schematically shows in the form of blocks the device of FIG. 1 in further detail according to an embodiment of the present disclosure.

FIG. 2 schematically shows in the form of blocks device 100 and particularly shows data reduction circuits 111a, 111b in further detail.

The data reduction circuits 111a, 111b of image sensor 102 and of processing unit 106 each comprise a control circuit 208a, 208b (CTRL CIRCUIT), coupled, for example, by control buses, to circuits for selecting pixels or packets 210a and 210b (PIXEL/PACKET SELECTION). Control circuits 208a and 208b are for example coupled together by a bus 212. Although control circuits 208a and 208b are coupled together by a control bus 212 in FIG. 2, in other embodiments, it would be possible for no bus to be present, provided for the programming of data reduction circuits 111a and 111b to be coherent with one another.

In certain embodiments, described in further detail hereafter, circuit 111a further comprises a pseudo-random number generator 211a (PRNG) and, similarly, circuit 111b further comprises a pseudo-random number generator 211b (PRNG), generators 211a, 211b being implemented in the same way and use a same counting root to reproduce a same number on either side of number generators 211a and 211b.

On the side of image sensor 102, pixel or packet selection circuit 210a receives the video flow from bus 104, and delivers the partial images to hashing circuit 113a. Similarly, on the side of processing unit 106, pixel or packet selection circuit 210b receives the video flow from bus 104, and delivers the partial images to hashing circuit 113b.

In certain cases, the selection step implemented by circuits 210a, 210b is carried out at the level of the image pixels, certain pixels of each image being selected to be hashed.

In other cases, the video flow is formed by a packet flow, the data of each image of the video flow being divided into a plurality of image data packets. Each packet contains, for example, the pixel data of a plurality of pixels of an image.

In this case, the selection step implemented by circuits 210a, 210b is for example carried out at the level of these data packets, one or a plurality of the packets of each image being selected to be hashed.

Control circuits 208a, 208b are for example configured to control pixel or packet selection circuits 210a and 210b so that these circuits 210a, 210b perform the same selection.

As an example, a hashing configuration is determined on the side of processing unit 206. This hashing configuration describes, for example, one or a plurality of positions of pixels that are to be hashed. For example, the pixel positions are defined by one or a plurality of parameters for selecting pixels of the image, or by one or a plurality of parameters of selection of packets in the packet flow. Control circuit 208b is then for example configured to transmit the hashing configuration to control circuit 208a. Control circuits 208a and 208b then control selection circuits 210a and 210b so that they apply the hashing configuration to the received images to partially reduce them. To ensure image protection, this selection is for example dynamically modified for each image or for each image group. Further, in certain cases this selection remains secret by being only known by image sensor 102 and processing unit 106.

In another example, the hashing configuration is determined on the side of image sensor 102 and is transmitted to control circuit 208b via bus 212.

According to still another embodiment, the hashing configuration is directly indicated in the image, for example, in a status line, by image processor 108. Circuit 208a is for example coupled to image processor 108 and is configured to recover the data of the status line. Similarly, control circuit 208b is for example coupled to buffer memory 110, and is configured to recover the data of the status line of the received image.

To make the hashed or non-hashed images of the video flow difficult to discern, control circuits 208a and 208b are for example configured to vary the hashing configuration from one image to the other, or from a number n of images to the other, where n is for example equal to or smaller than 10. Thus, the portion of the hashed images differs according to the images of the video flow. It is then difficult for an attacker to deduce, and accordingly to modify or falsify, the image portions non-protected by hashing.

Figure 3:
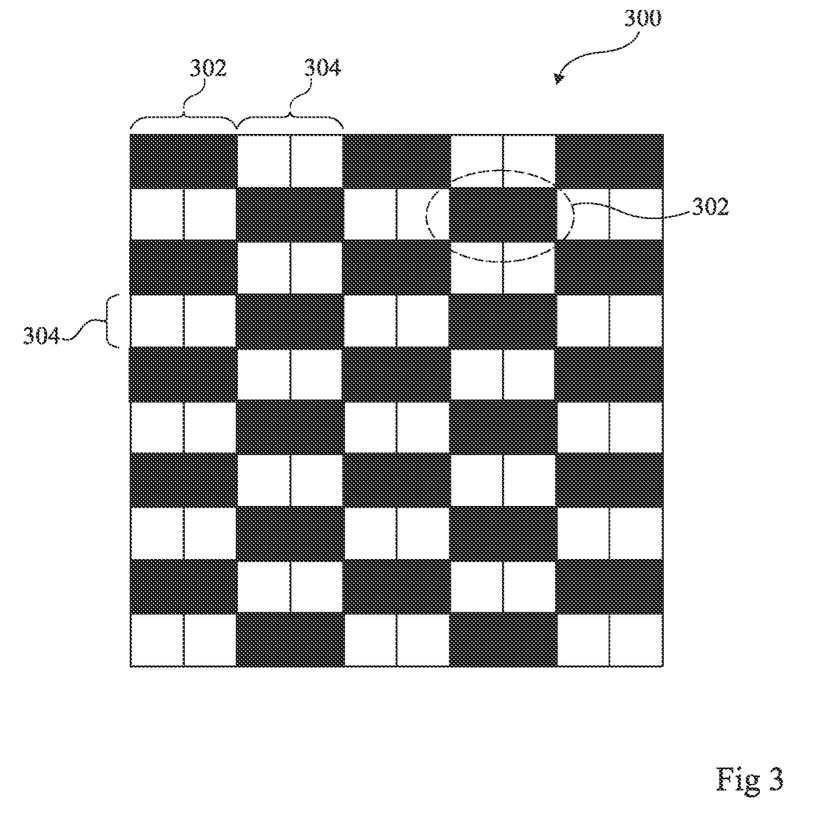
FIG. 3 shows an image and illustrates an example of a configuration of partial hashing of an image.

FIG. 3 illustrates an example of a partial hashing configuration of an image 300. Although in the example of FIG. 3, image 300 is formed of 100 pixels arranged over 10 rows and 10 columns, any image size and format is possible. Indeed, in practice, the images captured by image sensor 102 are of significant size, for example, a width and a length of several thousands of pixels. Image 300 is an arrangement of pixels at corresponding pixel positions, and each pixel is associated with one or a plurality of corresponding pixel data. For example, one or a plurality of pixel data define a luminance value, a chrominance value, and/or other values. The pixel data of the pixel forming image 300 are not illustrated in FIG. 3.

An example of hashing configuration of image 300 comprises only hashing groups 302 of consecutive pixels (illustrated in black) and not hashing groups 304 of consecutive pixels (illustrated in white). In the example of FIG. 3, groups 302 and 304 have the same size, and each group is formed of two pixels. In other embodiments, groups 302 and 304 are of different size, and/or the number of pixels in each group is different from two.

As an example, image 300 is processed row by row and the partial hashing configuration illustrated in FIG. 3 thus comprises hashing the first two pixels of the first row, and then not hashing the next two pixels, and so on until the end of the first row. The first two pixels of the first row will not be hashed, the next two pixels will be hashed, and so on until the end of the second row, and then until the end of image 300. In the example of FIG. 3, for two different hashing configurations, the positions of the pixels to be hashed in the image differ. In other words, certain positions of pixels to be hashed in a first hashing configuration are not to be hashed in a second hashing configuration. For example, the number of pixels in each group 302 to be hashed varies between the first and second configurations, and/or the number of pixels in each group 304 varies between the first and second configurations.

Figure 4:
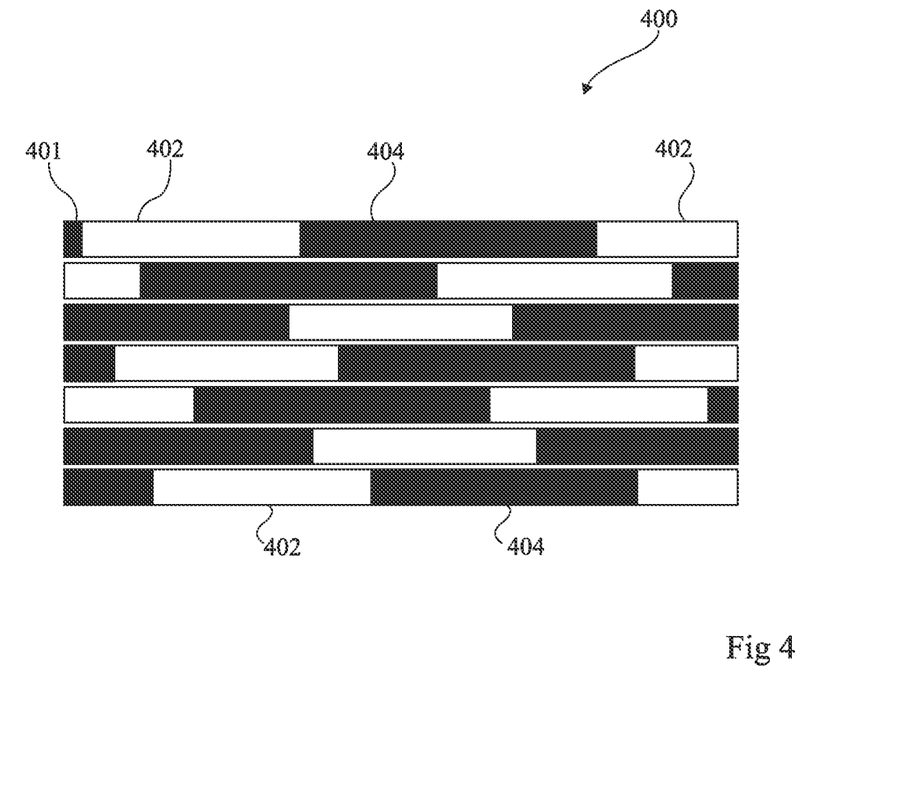
FIG. 4 shows an image packet flow and illustrates an example of partial hashing configuration of an image.

FIG. 4 shows a packet flow 400 of an image and illustrates an example of a hashing configuration.

According to the embodiment shown in FIG. 4, each image of the video flow is formed of a plurality of data packets, and the size of the data packets is programmable. For example, referring to FIG. 2, processor 108 is configured to generate the data packets of each image with a certain size in terms of the number of pixels represented by the packet. Control circuit 208a is for example configured to control the size of the packets generated by processor 108 according to the configuration to be applied. Only certain packets are then selected, by selection circuits 210a, 210b, in order to be hashed.

In FIG. 4, a sequence of packets of an image is shown, black packets being packets that are not hashed, and white packets being packets which are hashed.

The example of hashing configuration of packet flow 400 comprises, for example, a first parameter describing an initial shift corresponding to the size of a first packet 401. First packet 401 is the first packet forming packet flow 400 and is not hashed. The partial hashing configuration for example comprises a second parameter defining the size of the packets to be hashed 402 as well as a third parameter defining the size of the packets not to be hashed 404, in other words the side of the packets to be skipped between two hashings of packets 402. In the example of FIG. 4, the initial shift 401, the size of packets 402, and/or the size of packets 404, vary from one configuration to the other.

The parameters of the configuration described in relation with FIG. 4 are provided as an example and are not limiting, other types of parameters may of course be envisaged. For example, it would be possible that, in other embodiments: the size of first packet 401 is fixed for each image of the video flow; and/or the size of the packets to be hashed is fixed for each image of the video flow, and only the size of the packets not to be hashed is variable; or the size of the packets not to be hashed is fixed for each image of the video flow, and only the size of the packets to be hashed is variable.

Further, in other embodiments, the size of the packets generated by processor 108 is fixed, and selection circuits 210a, 210b are configured to select, under control of circuits 208a, 208b, the number of consecutive packets that are hashed, and/or the number of consecutive packets which are not hashed.

Figure 5:
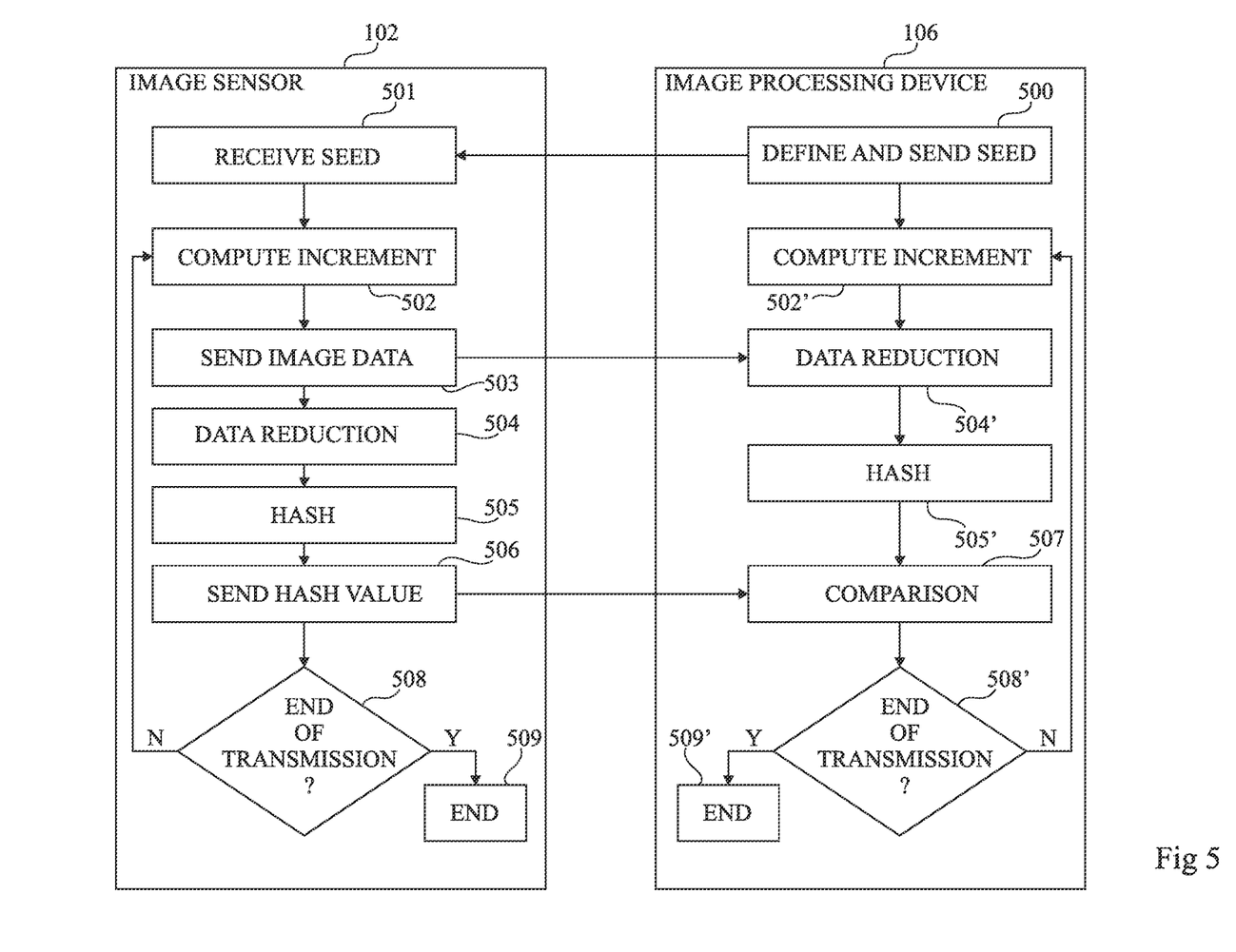
FIG. 5 is a flowchart showing operations of a video flow transmission and integrity verification method according to an example of embodiment of the present disclosure.

FIG. 5 is a flowchart showing operations of a method of transmission and of verification of the integrity of the images of a video flow in the device 100 of FIGS. 1 and 2 according to an example of embodiment of the present disclosure. The steps carried out by image sensor (IMAGE SENSOR) 102 and by processing unit (IMAGE PROCESSING DEVICE) 106, are shown.

At a step 500 (DEFINE AND SEND SEED), processing unit 106 generates a seed of a random sequence and transmits it to the image sensor 102, which receives it at a step 501 (RECEIVE SEED). As an example, the transmission of the seed is encrypted to improve the security. The random seed is then used by image sensor 102 and by processing unit 106 to generate a number or a sequence of numbers. The seed is for example injected, as an initial state, into the pseudo-random number generators 211a, 211b implemented in image sensor 102 and in processing unit 106. The generated number, or the sequence of generated numbers, is thus identical on the side of image sensor 102 and on the side of processing unit 106.

At a step 502 (COMPUTE INCREMENT) carried out by image sensor 102, and a similar step 502' (COMPUTE INCREMENT) carried out by processing unit 106, image sensor 102 and processing unit 106 determine, each on their side, the hashing configuration to be applied based on the number generated by generators 2n1a, 211b. For example, this step is carried out by control circuits 208a, 208b, which each comprise an accumulator (not illustrated). The accumulator of each control circuit 208a, 208b is initially at a same initial value, equal for example to zero. The number generated by generators 211a, 211b is for example used by each control circuit 208a, 208b to calculate an increment, which may be equal to the generated number, or determined according to the generated number. The increment is for example added to the initial value of the accumulator, and the result is supplied by the accumulator as an output value. The output value of the accumulator for example defines the number of pixels of the groups 302 and 304 of FIG. 3, or the size of the initial shift 401, and/or the sides of packets 402, and/or the size of the packets 404 described in relation with FIG. 4. At a step 503 (SEND IMAGE), subsequent to step 502, image sensor 102 transmits one or a plurality of packets or one or a plurality of images, for example, over data bus 104, to processing unit 106. Indeed, in certain embodiments, the hash parameters are modulated within a same image. For example, the size of packets 404 is recalculated, based on the accumulator, after each processing of a packet 402. In other embodiments, each hash parameter is applied to one or a plurality of images before being modulated.

At a step 504 (DATA REDUCTION) carried out by image sensor 102, and a step 504' (DATA REDUCTION) carried out by processing unit 106, data reduction circuits 111a, 111b perform a reduction of the received image(s) based on the configuration defined by the value at the output of the accumulator. On the side of image sensor 102, the image is for example reduced by selection circuit 210a under control of control circuit 208a, and on the side of processing unit 106; the image is for example reduced by selection circuit 210b under control of control circuit 208b.

At a step 505 (HASH) carried out by image sensor 102, and a step 505' (HASH) carried out by processing unit 106, the reduced images are then hashed, by hash circuits 113a, 113b.

At a step 506 (SEND HASH VALUE), the hash value obtained on the side of image sensor 102 is transmitted to processing unit 106, and in particular to comparator 117.

The hash value transmitted by image sensor 102 is then compared with the hash value generated in processing unit 106 by hash circuit 113b. Step 507 enables to determine whether the image transmitted by image sensor 102 has been falsified or modified. If the two hash values are identical, the image received on the side of processing unit 106 is considered as integral, and the image for example carries on a processing by processing unit 106 depending on the application. If, however the two hash values are not identical, the image received on the side of processing unit 106 is considered as being corrupt, and this image is for example suppressed without carrying on another processing by processing unit 106.

A step 508 (END OF TRANSMISSION) following step 506 on the side of image sensor 102, and a similar step 508' (END OF TRANSMISSION) following step 507 on the side of processing unit 106, comprise determining whether the video transmission has ended. If not (branch "N"), the method resumes at step 502 on the side of image sensor 102 and at step 502' on the side of processing unit 106, where a new increment value is calculated by the accumulators by adding a new number supplied by generators 211a, 211b. If it is determined, at steps 508, 508', that the transmission is over, the method ends at corresponding steps (END) 509, 509'.

Although in the example of method of FIG. 5, the hashing configuration is modified for each image, in other examples, the hashing configuration is only modified after it has been used for n consecutive images of the video flow. In other words, a same configuration, based on a value of the accumulator, is used on a number n of consecutive images of the video flow.

Figure 6:
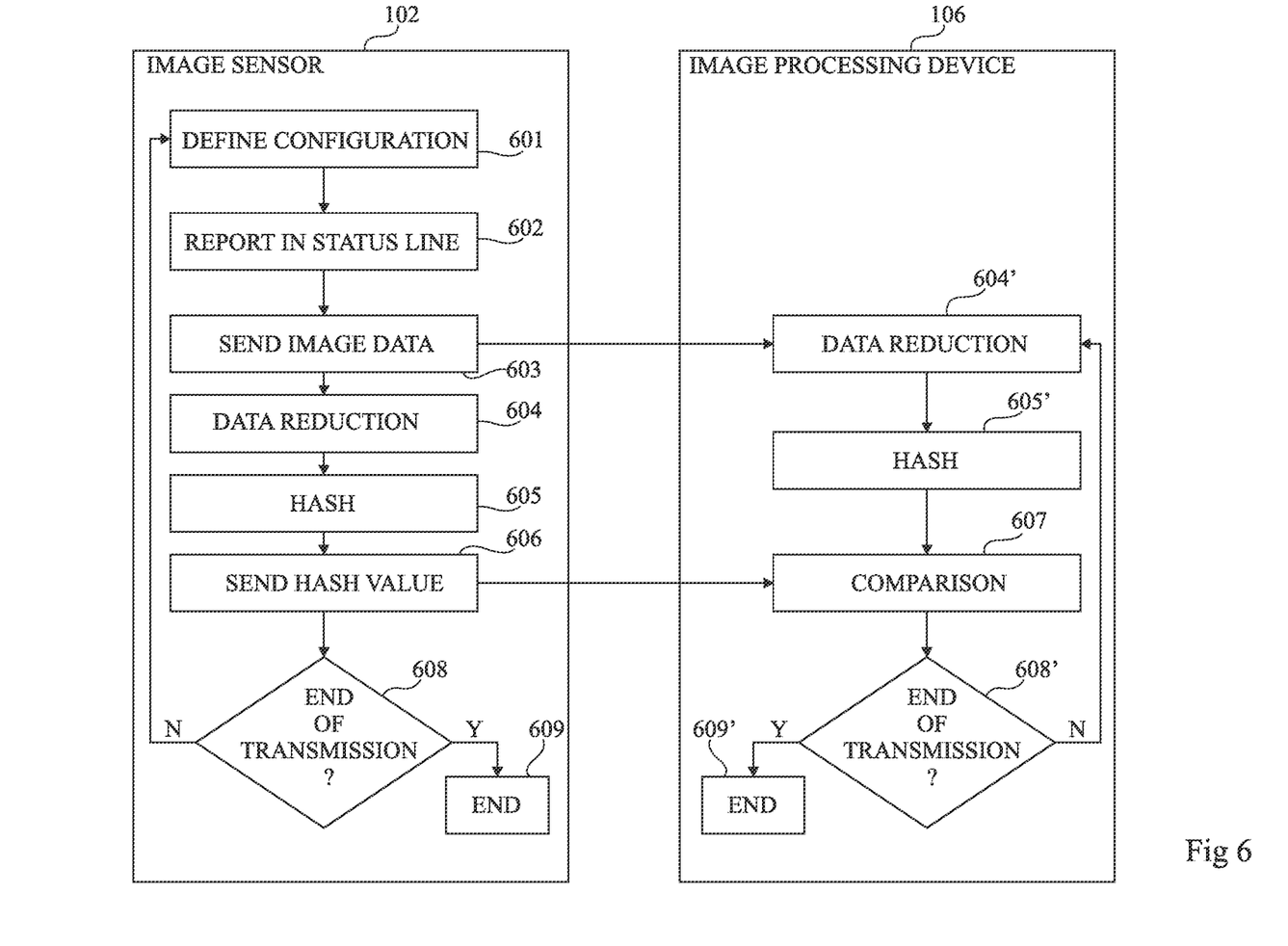
FIG. 6 is a flowchart showing operations of a video flow transmission and integrity verification method according to another example of embodiment of the present disclosure.

FIG. 6 is a flowchart showing operations of a method of transmission and verification of the integrity of a video flow according to another example of embodiment of the present disclosure.

At a step 601 (DEFINE CONFIGURATION), image sensor 102 defines a hashing configuration. The hashing configuration is for example defined by the number of pixels of the groups 302 and 304 of FIG. 3, or by parameters such as the initial shift 401 and/or the size of packets 402 and/or the size of the packets 404 of FIG. 4.

At a step 602 (REPORT IN STATUS LINE), image sensor 102 reports, for example via image processor 108, the hashing configuration defined at step 601 in a status line of one or a plurality of consecutive images of the video flow. According to an embodiment, the hashing configuration is reported in encrypted form to increase the security.

After step 602, steps 603 to 609 and 604' to 609', respectively similar to the steps 503 to 509 and 504' and 509' of the method of FIG. 5, are carried out. Steps 603 to 609 and 604' to 609' are not described in detail again. At step 604, control circuit 208a is for example configured to apply the configuration defined at step 601 by controlling selection circuit 210a. Similarly, at step 604', control circuit 208b is for example coupled to buffer memory 110 and is configured to read the status line of the received images, to apply the configuration defined by image sensor 102 by controlling selection circuit 210b. Processing unit 106 then performs, via the selection circuit 210b controlled by control circuit 208b, a reduction of the image(s) at step 604. The image is then reduced based on the configuration indicated in the status line.

Figure 7:
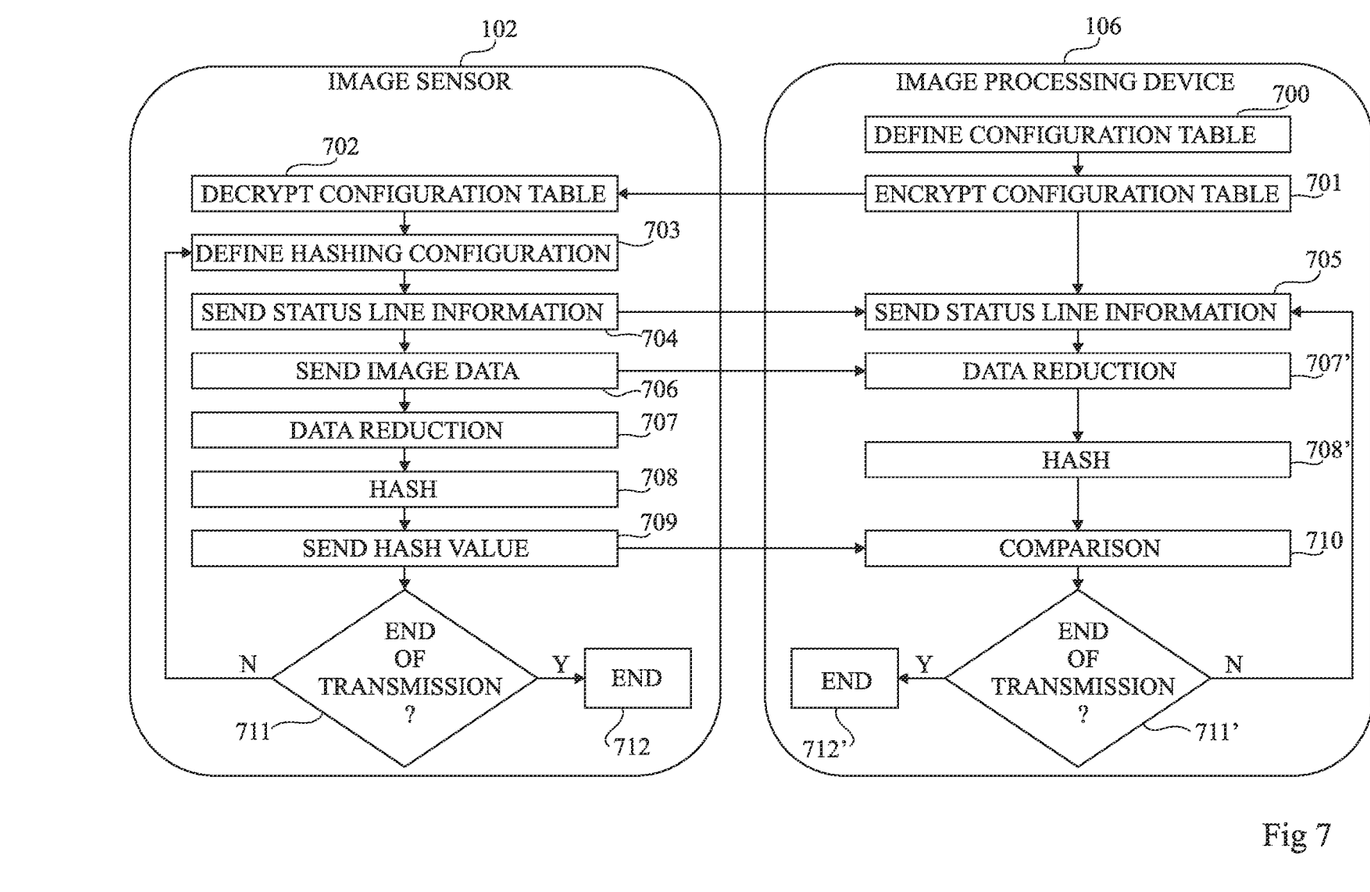
FIG. 7 is a flowchart showing operations of a video flow transmission and integrity verification method according to still another example of embodiment of the present disclosure.

FIG. 7 is a flowchart showing operations of a method of transmission and verification of the integrity of a video flow according to another example of embodiment of the present disclosure.

At a step 700 (DEFINE CONFIGURATION TABLE), taking place before the recording of the video flow by image sensor 102, processing unit 106 generates, for example via a generic processor forming part of control circuit 208b, a table containing a plurality of configurations different from one another. For example, the table contains at least three different configurations, and in certain cases at least five different configurations. These different configurations are for example defined by the number of pixels of the groups 302 and 304 of FIG. 3, or by parameters such as an initial shift 401 and/or the size of packets 402 and/or the size of the packets 404 of FIG. 4. Other ways of defining the different configurations may of course be envisaged and are within the abilities of those skilled in the art. Each configuration is for example indexed by a corresponding index in the configuration table.

Processing unit 106 is for example configured to then cipher the configuration table at a step 701 (ENCRYPT CONFIGURATION TABLE). As an example, the cipher algorithm used is a symmetrical key cipher algorithm such as AES ("Advanced Encryption Standard"). In another example, the cipher algorithm used is an asymmetrical key algorithm, using pairs of private and public keys, such as for example the RSA (Rivest Shamir Alderman) algorithm.

Processing unit 106 is further configured to transmit the ciphered configuration table to image sensor 102, which deciphers it at a step 702 (DECRYPT CONFIGURATION TABLE). As an example, image sensor 102 and processing unit 106 each contain a cryptographic processor configured to cipher and decipher the configuration table.

At a step 703 (DEFINE HASHING CONFIGURATION), image sensor 102 then generates an index of the table at which is indexed a configuration which will be used for the or the n first images of the flow, n being a positive integer, for example predetermined upstream of the recording of the video flow. The index is for example obtained by random generation.

At a step 704 (SEND STATUS LINE INFORMATION), image sensor 102 indicate the index of the table generated at the previous step in a status line of the image or the n consecutive images of the flow. Image sensor 102 then transmits the status line to processing unit 106.

At a step 705 (RECEIVE STATUS LINE INFORMATION), processing unit 106 is configured to read the status line. As an example, the reading is performed by control circuit 208*b*.

After step 705, steps 706 to 712 and 707' to 712', respectively similar to the steps 503 to 509 and 504 to 509' of the method of FIG. 5, are carried out, and these steps are not described again in detail.

After step 711 (END OF TRANSMISSION), if the transmission is still going on, the method resumes at step 703, and a new configuration is defined. The new configuration is for example obtained by random generation of an index value of the configuration table. In another example, a rotation of the bits is applied to the index value previously used to obtain the new index. For example, the table comprises six configurations indexed by six-bit indexes "000001" to "100000," and a rotation of these bits is used to generate each index in turn. Still in another example, the new index value is generated by processing unit 106, and is transmitted to image sensor 102.

An advantage of the described embodiments is that they enable a device having a limited hash performance, to partially hash the images of a video flow while providing a high security level by varying the hashing configurations. Preferably, the hashing configurations are made non-visible to any observer of the links between image sensor 102 and processing unit 106.

Various embodiments and variants have been described. Those skilled in the art will understand that certain features of these various embodiments and variants may be combined, and other variants will occur to those skilled in the art. In particular, the selection of the different configurations and of the parameters describing them is within the abilities of those skilled in the art. Indeed, the number of consecutive images to which a configuration is applied may be one of the parameters. Thus, the number of consecutive hashed images based on a same configuration varies according to the selected configuration. Similarly, other methods enabling the image sensor and the processing unit to hash in parallel images based on the same configuration are within the abilities of those skilled in the art. Further, although in the described examples, image sensor 102 and processing unit 106 form part of a same device 100, in other embodiments, it would be possible for image sensor 102 and processing unit 106 to form part of different devices coupled by a communication interface that may be wired or wireless.

Finally, the practical implementation of the described embodiments and variants is within the abilities of those skilled in the art based on the functional indications given hereinabove. In particular, hardware implementations of processing unit 106 and of image sensor 102 are within the abilities of those skilled in the art. Similarly, the implementation of the image reduction functions and of the hash functions are within the abilities of those skilled in the art.

What is claimed is:

1. A video flow transmission method, comprising:
generating, by an image sensor comprising an arrangement of pixels at corresponding pixel positions of a pixel array, a video flow comprising a first image and a second image, each of the first image and the second image comprising pixel data corresponding to respective pixels of the arrangement of pixels of the image sensor;
hashing, by the image sensor, a portion of the first image based on a first hashing configuration to generate a first hash value based only on the portion of the first image, the first hashing configuration defining pixel data to be hashed corresponding to first pixel positions of the pixel array;
hashing, by the image sensor, a portion of the second image based on a second hashing configuration different from the first hashing configuration to generate a second hash value based only on the portion of the second image, the second hashing configuration defining pixel data to be hashed corresponding to second pixel positions of the pixel array; and
transmitting, by the image sensor, the first image, the second image, the first hash value and the second hash value to a second device, wherein:
each image of the video flow comprises a plurality of data packets, each packet of the plurality of the data packets comprising a plurality of pixel data associated with the pixel data of the first image or the second image, and a size of each data packet being programmable, and each of the first hashing configuration and the second hashing configuration defines:
a size of one or a plurality of packets of an image to be hashed and a size of one or a plurality of packets of an image not to be hashed, or
the size of the one or the plurality of packets of the image to be hashed and the size of the one or the plurality of packets of the image not to be hashed.

2. The method according to claim 1, wherein:
at least one pixel position among the first pixel positions does not belong to the second pixel positions; or
at least one pixel position among the second pixel positions does not belong to the first pixel positions.

3. The method according to claim 1, further comprising:
transmitting, from the image sensor to the second device, one or a plurality of values indicating the first hashing configuration and the second hashing configuration.

4. The method according to claim 1, further comprising:
before hashing the portion of the first image and before hashing the portion of the second image, receiving, by the image sensor, from the second device, a configuration table in which the first hashing configuration is configured to be indexed according to a first index and the second hashing configuration is configured to be indexed according to a second index; and
transmitting, by the image sensor, the first index and the second index to the second device.

5. The method according to claim 4, wherein:
the configuration table received by the image sensor is ciphered; and
the method further comprises deciphering, by the image sensor, the ciphered configuration table.

6. The method according to claim 4, wherein the first index is transmitted to the second device in a status line of the first image and the second index is transmitted to the second device in a status line of the second image.

7. The method according to claim 4, wherein the first index and the second index are randomly selected, by the image sensor, from among at least three indexes.

8. The method according to claim 1, wherein:
the first hashing configuration is indicated, to the second device, by the image sensor in a status line transmitted with the first image; and
the second hashing configuration is indicated, to the second device, by the image sensor, in a status line transmitted with the second image.

9. The method according to claim 1, wherein hashing the portion of the first image and before hashing the portion of the second image comprise using a SHA-2 algorithm.

10. The method according to claim 1, wherein:
a proportion of pixels corresponding to the first pixel positions of the pixel array to all pixels of the pixel array is between 25% and 80%; and
a proportion of pixels corresponding to the second pixel positions of the pixel array to all pixels of the pixel array is between 25% and 80%.

11. The method according to claim 1, further comprising generating, by a random number generator, the size of the one or the plurality of packets of the image to be hashed or the size of the one or the plurality of packets of the image not to be hashed.

12. A method of verifying an integrity of a video flow, comprising:
receiving, by a processing device, the video flow comprising a first image and a second image, each of the first image and the second image comprising pixel data corresponding to respective pixels of an arrangement of pixels at corresponding positions of a pixel array of an image sensor;
receiving, by the processing device, a first hash value associated with the first image and a second hash value associated with the second image;
hashing, by the processing device, a portion of the first image based on a first hashing configuration to generate a further first hash value based only on the portion of the first image, the first hashing configuration defining pixel data to be hashed corresponding to first pixel positions of the pixel array;
hashing, by the processing device, a portion of the second image based on a second hashing configuration to generate a further second hash value based only on the portion of the second image, the second hashing configuration being different from the first hashing configuration and defining pixel data to be hashed corresponding to second pixel positions of the pixel array; and
verifying, by the processing device, the integrity of the video flow based on a first comparison of the first hash value with the further first hash value and on a second comparison of the second hash value with the further second hash value.

13. The method according to claim 12, further comprising:
determining, by the processing device, the first pixel positions and the second pixel positions of the pixels to be hashed according to a random sequence generated from a seed; and
transmitting, by the processing device, the seed to the image sensor.

14. The method according to claim 12, further comprising deactivating the image sensor when the first hash value does not correspond to the ether further first hash value or the second hash value does not correspond to the ether further second hash value.

15. An image sensor comprising:
a pixel array configured to capture images;
a first processing device configured to:
receive images captured by the pixel array,
generate a video flow comprising at least one first image and at least one second image, and
transmit the video flow to a second device, wherein the at least one first image and the at least one second image comprises pixel data corresponding to respective pixels of an arrangement of pixels at corresponding positions of the pixel array; and
a hashing circuit, configured to:
hash a portion of the first image based on a first hashing configuration,
generate a first hash value based only on the portion of the first image,
transmit the first hash value to the second device, the first hashing configuration defining pixel data to be hashed corresponding to first pixel positions of the pixel array,
hash a portion of the second image based on a second hashing configuration,
generate a second hash value based only on the portion of the second image, and
transmit the second hash value to the second device, the second hashing configuration being different from the first hashing configuration and defining pixel data to be hashed corresponding to second pixel positions of the pixel array, wherein:
each image of the video flow comprises a plurality of data packets, each packet of the plurality of the data packets comprising a plurality of pixel data associated with the pixel data of the first image or the second image, and a size of each data packet being programmable, and each of the first hashing configuration and the second hashing configuration defines:
a size of one or a plurality of packets of an image to be hashed and a size of one or a plurality of packets of an image not to be hashed, or
the size of the one or the plurality of packets of the image to be hashed and the size of the one or the plurality of packets of the image not to be hashed.

16. The image sensor of claim 15, wherein:
a proportion of pixels corresponding to the first pixel positions of the pixel array to all pixels of the pixel array is between 25% and 80%; and
a proportion of pixels corresponding to the second pixel positions of the pixel array to all pixels of the pixel array is between 25% and 80%.

17. A system comprising:
a first processing device configured to:
  receive a video flow comprising a first image and a second image, each image of the first image and the second image comprising pixel data corresponding to respective pixels of an arrangement of pixels at corresponding positions of a pixel array of an image sensor;
  receive a first hash value associated with the first image and a second hash value associated with the second image;
  hash a portion of the first image based on a first hashing configuration to generate a further first hash value based only on the portion of the first image, the first hashing configuration defining pixel data to be hashed corresponding to first pixel positions of the pixel array;
  hash a portion of the second image based on a second hashing configuration to generate a further second hash value based only on the portion of the second image, the second configuration being different from the first hashing configuration and defining pixel data to be hashed corresponding to second pixel positions of the pixel array; and
  verify an integrity of the video flow based on a first comparison of the first hash value with the further first hash value and on a second comparison of the second hash value with the further second hash value.

18. The system of claim 17, wherein:
each image of the video flow comprises a plurality of data packets, each packet of the plurality of the data packets comprising a plurality of pixel data associated with the pixels of the first image or the second image; and
each of the first hashing configuration and the second hashing configuration defines:
  a size of one or a plurality of packets of a portion of an image to be hashed, and
  a size of one or a plurality of packets of a portion of an image not to be hashed, or
  the size of the one or the plurality of packets of the portion of the image to be hashed and the size of the one or the plurality of packets of the portion of the image not to be hashed.

19. The system of claim 18, wherein the system further comprises a random number generator configured to generate the size of the one or the plurality of packets of the portion of the image to be hashed or the size of the one or the plurality of packets of the portion of the image not to be hashed.

20. The system of claim 17, further comprising:
the image sensor comprising:
  the pixel array configured to capture images;
  a second processing device configured to:
    receive images captured by the pixel array,
    generate the video flow, and
    transmit the video flow to the first processing device; and
  a hashing circuit, configured to:
    hash the portion of the first image based on the first hashing configuration,
    generate the first hash value,
    transmit the first hash value to the first processing device,
    hash the portion of the second image based on the second hashing configuration,
    generate the second hash value, and
    transmit the second hash value to the second processing device.

\* \* \* \* \*

UNITED STATES PATENT AND TRADEMARK OFFICE
CERTIFICATE OF CORRECTION

| | | |
|---|---|---|
| PATENT NO. | : 12,335,402 B2 | Page 1 of 1 |
| APPLICATION NO. | : 18/150566 | |
| DATED | : June 17, 2025 | |
| INVENTOR(S) | : Jérôme Pierre René Chossat et al. | |

It is certified that error appears in the above-identified patent and that said Letters Patent is hereby corrected as shown below:

In the Claims

In Column 14, Line 20, Claim 14:
Change "the ether further first hash value"
To --the further first hash value--

In Column 14, Line 21 and 22, Claim 14:
Change "does not correspond to the ether further second hash value."
To --does not correspond to the further second hash value.--

Signed and Sealed this
Thirtieth Day of September, 2025

John A. Squires
*Director of the United States Patent and Trademark Office*